3,289,480
PRESSURE DETECTOR AND UNIT
Charles T. Sams, 1411 Parkview Drive, Poplar Bluff, Mo.
Filed May 11, 1964, Ser. No. 366,300
1 Claim. (Cl. 73—419)

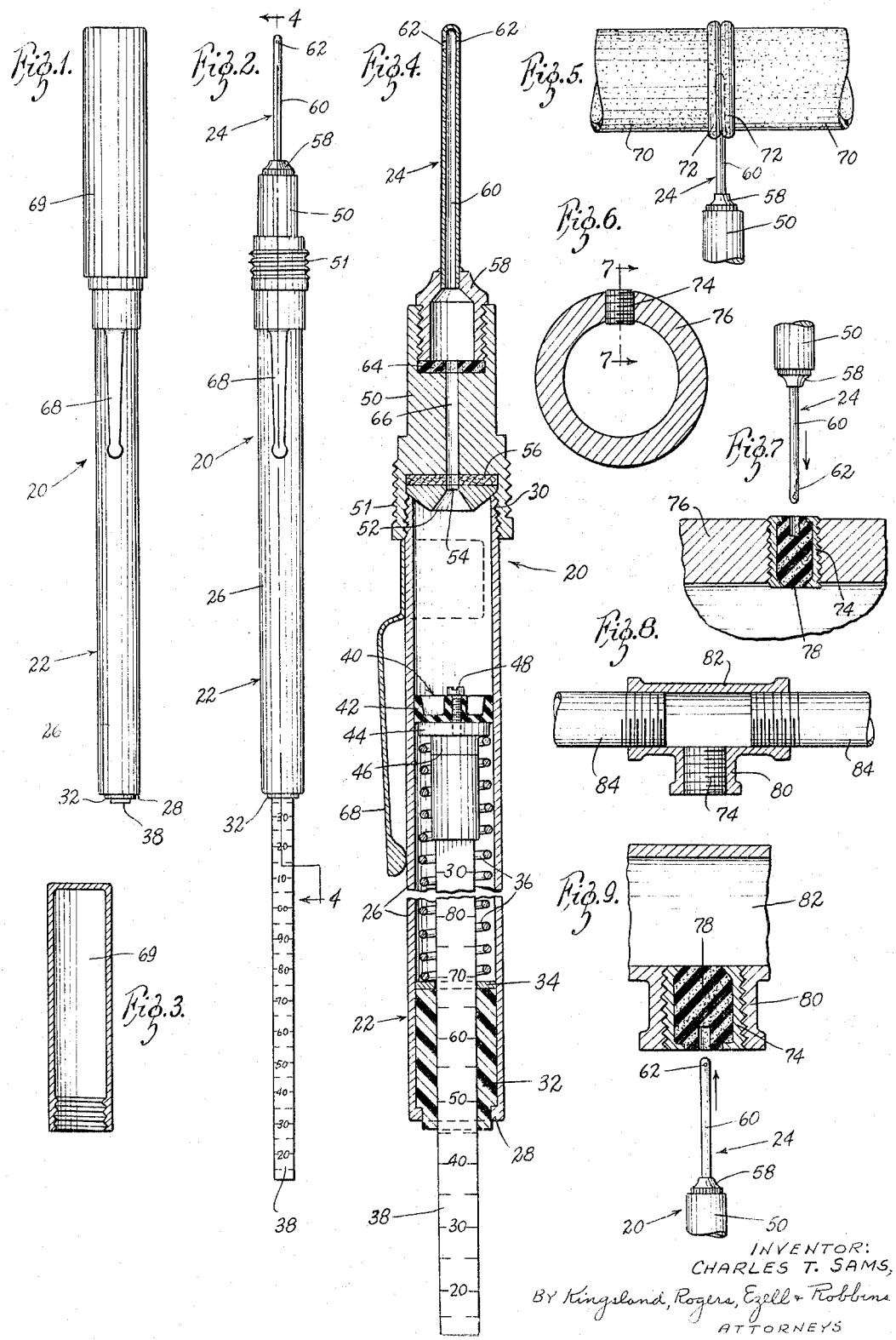
Dec. 6, 1966 C. T. SAMS 3,289,480
PRESSURE DETECTOR AND UNIT
Filed May 11, 1964
INVENTOR:
CHARLES T. SAMS,
BY Kingsland, Rogers, Ezell & Robbins
ATTORNEYS United States Patent Office 3,289,480
Patented Dec. 6, 1966

The present invention relates generally to pressure gauges, and more particularly to a novel pressure detector unit and miniature pressure detector.

There has long existed the need for a small effective accurate pressure detector and a detector unit to measure pressures in closed systems without interference with the system, such as the brake airline of a train.

Hence, an object of the present invention is to provide a novel pressure detector and a pressure detector unit which solve the long existing problem.

In brief, the present novel pressure detector includes a pressure gauge component having an indicator stick, and a tubular needle-like probe for intercepting a closed system or closed area under pressure. The pressure detector unit includes, in addition, means facilitating insertion of the needle-like probe into a system under pressure.

Therefore, another object is to provide a novel pressure detector and pressure detector unit of miniature size capable of accurate measurement over a wide range of use.

Another object is to provide a novel pressure detector and pressure detector unit highly effective in measuring pressures in closed systems, and the like.

Other objects are to provide a novel pressure detector and pressure detector unit which are sturdy in construction, which can be readily used accurately with minimum instructions, which register a pressure and maintain such indication after use and withdrawal of the detector, which clearly indicate the measured pressure, and which otherwise fulfill the objects and advantages sought therefor.

The foregoing and other objects and advantages are apparent from the following description taken with the accompanying drawings, in which:

FIGURE 1 is a side elevational view of a miniature pressure detector constructed in accordance with the principles of the present invention;

FIGURE 2 is a similar view thereof, the needle-like probe protector covering being removed and the pressure indicator projected;

FIGURE 3 is a central longitudinal cross-sectional view through the cover;

FIGURE 4 is an enlarged cross-sectional view taken on substantially the line 4—4 of FIGURE 2, the indicator stick and internal movable parts being shown under a pressure of about 36 pounds instead of 136 pounds as in FIGURE 2;

FIGURE 5 is a side elevational view of an air hose coupling illustrating the pressure detector in operative relation therewith;

FIGURE 6 is a transverse, cross-sectional view through a pipe in which is mounted a fitting forming part of the present novel pressure detector unit;

FIGURE 7 is an enlarged cross-sectional view taken on substantially the line 7—7 of FIGURE 6;

FIGURE 8 is a cross-sectional view through a modified fitting; and

FIGURE 9 is an enlarged view of a fragment thereof illustrating details.

Referring to the drawings more particularly by reference numerals, 20 indicates generally a miniature pressure detector constructed in accordance with the teachings of the present invention. Broadly, the detector 20 includes a pressure gauge component 22 and a tubular needle-like probe 24 operatively connected thereto.

The gauge component 22 may be of presently known construction and is illustrated as of pocket size having a length and diameter approximating those of a fountain pen. The gauge component 22 includes a casing 26 having a radially inturned flange 28 at one end and external threads 30 at the other end. A bushing 32 of plastic material is disposed adjacent the flange 28 and is formed with a shoulder engaging the same. Adjacent the inner end of the bushing 32 is a washer 34 which receives one end of a compression spring 36. Frictionally engaging the bushing 32 is an indicator stick 38 of square cross-section in order to afford ready viewing of the indicated pressure which extends through the spring 36 and is engaged at its inner end by a reciprocatable piston member 40 having a piston portion 42 of any suitable material forming a sliding seal with the inner wall of the casing 26, a body portion 44 and a reduced portion 46 which engages the inner end of the indicator stick 38. The piston portion 42 is secured to the main body portion 44 by a screw 48.

An annular adapter member 50 threadedly engages the threads 30 of the casing 26 and is of the configuration clearly shown in FIGURE 4, having external threads 51. Trapped between the end of the casing 26 and the adapter member 50 is a metering member 52 having an orifice 54 therethrough of predetermined cross-section. A felt washer 56 having an opening centrally thereof is disposed between the metering member 52 and the adapter member 50.

The adapter member 50 is internally threaded at its outer end and threadedly receives a mounting base portion 58 of the tubular needle-like probe 24. A needle-like portion 60 having openings 62 at the free end thereof is welded or otherwise secured in position in the base portion 58. A rubber washer 64 having a central opening therethrough seals the connection between the base portion 58 and the adapter member 50. A bore 66 extends through the adapter member 50 connecting the probe 24 with the interior of the gauge component 22. A pocket clip 68 is mounted on the casing 26. A cover 69 engages the threads 51 on the adapter member 50.

In FIGURE 5, the pressure indicator 20 is employed in determining the pressure within the coupled hose members 70, the probe 24 being inserted through adjacent rubber gasket elements 72 which are employed for sealing coupling junctures of airlines of the brake system of a train, for example. It will be noted that the use of the indicator 20 in this manner does not interrupt the system. The air pressure within the segments 70 is quickly and accurately determined.

In FIGURES 6 and 7, there is shown a plug 74 threaded through the wall of a pipe 76 adapted to carry air or other fluid under pressure. The plug 74 includes penetratable self-sealing material 78 through which the probe 24 may pass to place the openings 62 thereof within the pipe 76 to measure the pressure and from which the probe 24 may be withdrawn without leakage from within the pipe 76.

In FIGURES 8 and 9 is a modification of the pressure unit element shown in FIGURES 6 and 7. Within the stem portion 80 of a T-connector 82 is disclosed a plug 74. The probe 24 of the pressure detector 20 can be pushed through the plug 74 into the T-connector 82 so that the openings 62 thereof are in the pressurized system, which includes the T-connector 82 and the pipe segments 84. After the pressure is registered on the indicator stick 38, the probe 24 is withdrawn without disturbing the pressurized system. Since the indicator stick 38 remains in the position to which it is moved by the pressure in the system or area tested, a reading may be made after the test and at a time when it can be recorded, if necessary. It is to be understood that the plug 74 may take any form so long as there is provided a suitable means for the insertion therethrough and removal therefrom of the probe 24 with substantially no loss of fluid from the pressure system being tested. There are many suitable devices and materials available on the open market.

It is manifest that there have been provided a novel pressure detector particularly adapted in miniature and a pressure detector unit which fulfill the objects and advantages sought therefor.

It is to be understood that the foregoing description and the accompanying drawing have been given by way of illustration and example. It is also to be understood that changes in form of the elements, rearrangement of parts, and substitution of equivalent elements, which will be obvious to those skilled in the art, are contemplated as within the scope of the present invention which is limited only by the claim which follows.

What is claimed is:

In combination, a pressure detector for measuring the pressure in closed systems and areas including an elongated slender gauge component, and an elongated slender probe operatively connected to said gauge component as an extension thereof, said probe including apertured needle-like means for tapping and receiving a pressurized fluid from a system, said probe being readily and quickly removable from said gauge component permitting quick cleaning thereof, means for communicating said pressure fluid to said gauge component to measure the same, said pressure detector being of a size and shape in the order of a fountain pen facilitating handling and pocket carrying, said gauge component including an indicator stick marked for ready reference, said indicator stick being adapted to remain in the pressure indicating position to which moved until manually retracted, said probe including means for removably receiving a cover for protecting the tapping means, a cover removably disposed on said probe, and means for maintaining said detector in a pocket.

References Cited by the Examiner

UNITED STATES PATENTS 1,716,399   6/1929   Watters _____ 73—419 X

FOREIGN PATENTS 669,827   12/1938   Germany.
786,794   11/1957   Great Britain.
944,496   12/1963   Great Britain.

LOUIS R. PRINCE, *Primary Examiner.*

D. O. WOODIEL, *Assistant Examiner.*